United States Patent Office 3,502,954
Patented Mar. 24, 1970

3,502,954
DIRECT DRIVING MECHANISM FOR AN
ULTRACENTRIFUGE
Dan H. Moore, Leonia, N.J., and John U. White, Darien,
Conn., assignors to Canal Industrial Corporation, a
corporation of Maryland
Filed Aug. 17, 1965, Ser. No. 480,407
Int. Cl. G05b 5/00
U.S. Cl. 318—481                                      7 Claims

ABSTRACT OF THE DISCLOSURE

A direct drive mechanism for an ultracentrifuge comprises a drive shaft having a integral dynamically balanced homogeneous cylindrical rotor of high coercivity magnetic material. An alternating-current stator surrounds the rotor and forms therewith a synchronous hysteresis motor which is energized from a high-frequency alternating-current source which is adjustable at any selected one of a number of accurately determined and accurately maintained frequencies, thereby to operate the ultracentrifuge at an accurately predetermined and maintained speed. The shaft and its rotor are supported by a compressed air thrust bearing and provided with a pair of alignment bearings above and below the rotor. Since the ultracentrifuge is designed to operate at speeds of 50,000 to 100,000 r.p.m., the drive mechanism includes certain safety features operative upon failure of air pressure to the thrust bearing: (a) an auxiliary normally inactive thrust bearing automatically brought into action; and (b) a pressure operated switch for automatically controlling the energization of the motor circuit.

Figure 1:
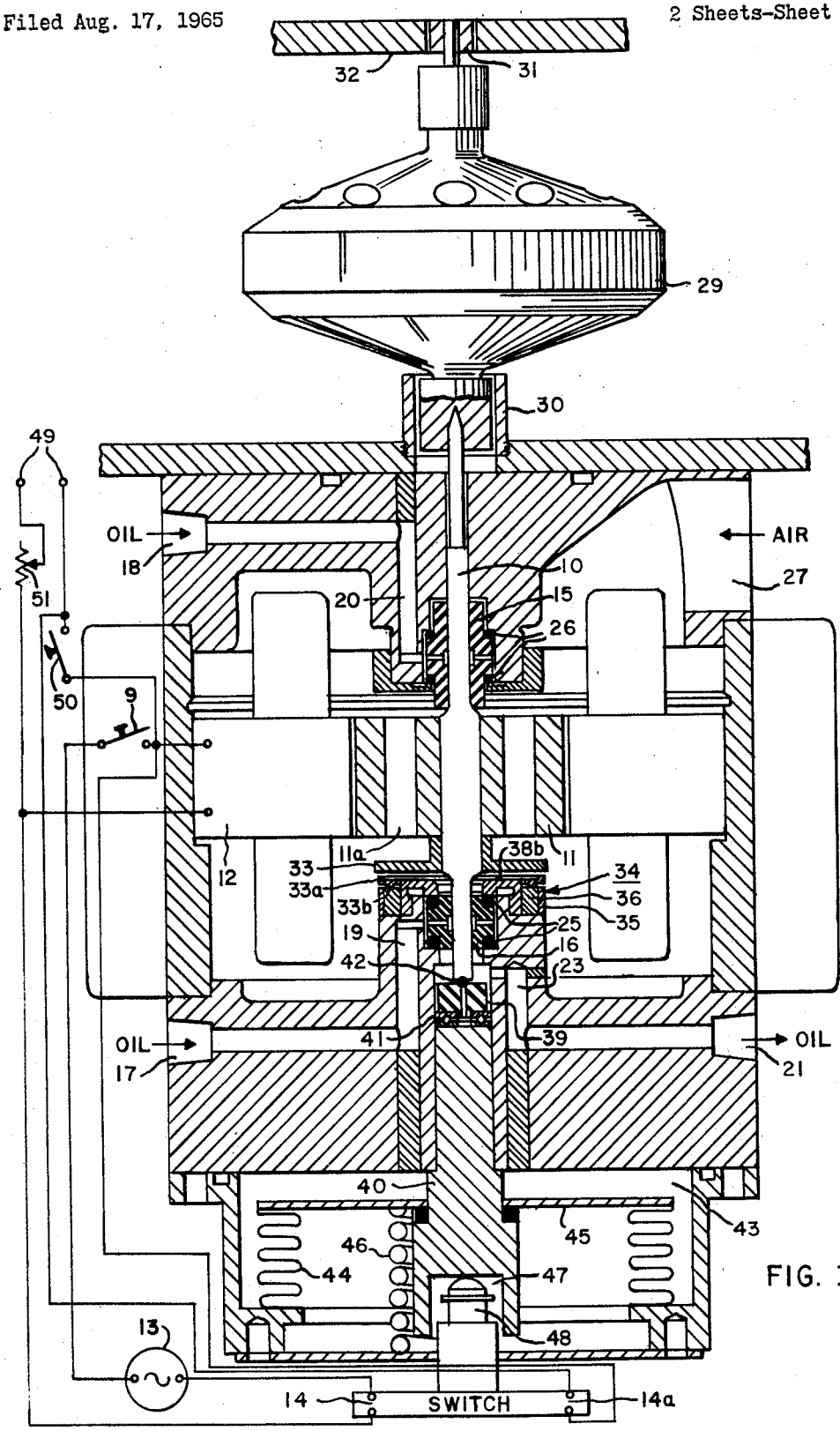

This invention relates to a direct driving mechanism for an ultracentrifuge and, more particularly, to such a mechanism designed and intended for operation in the range of 50,000 to 100,000 r.p.m.

It is well understood that, in order to provide a precise analysis of the several colloidal or solute constituents of natural or synthetic liquids in an ultracentrifuge, it is necessary accurately to maintain the speed of the device at a selected and known value within a range of speeds. By the term "precise analysis" is meant the accurate determination of the sedimentation constant of each constituent of the liquid. It is also well known that, for the sedimentation of low molecular weight constituents or constituents differing only slightly in sedimentation rates, it is necessary that the ultracentrifuge operate at extremely high speeds, for example in the range 50,000 to 100,000 r.p.m. Also, for the recovery of separated fractions, it is necessary to decelerate and stop the ultracentrifuge very slowly and without vibration or precession.

The prior drives for ultracentrifuges have all been indirect, that is, through belts, gears, or the like. Direct drives have not heretofore been available for ultra-high-speed ultracentrifuges because the only motors available have been relatively low-speed commutator-type motors having wound rotating armatures which would not withstand the tremendous centrifugal forces at 50,000 r.p.m. and upwards. Moreover, even if such a motor armature could withstand the forces, it is a composite structure which is difficult to balance dynamically and virtually impossible to maintain dynamically balanced with variations in temperature, due to different temperature coefficients of the various materials of the composite structure.

The prior indirect drives for ultracentrifuges involving low-speed motors, gears, or belts have had a number of disadvantages. A precise control of the speed and monitoring of the speed have been difficult, if not impossible, and, without such a precision speed control, measurements of sedimentation constants from which molecular weights and other properties of sedimenting materials are calculated are not accurate. Since the centrifugal force varies as the square of the speed, sedimentation rate is very sensitive to speed. Moreover, the driving mechanism, whether including gears or belts and pulleys, has often introduced troublesome vibration. Because of this and the heavy loads involved, the driving mechanisms have been short-lived, requiring replacement after use of the order of 500 hours. Another disadvantage of the indirect drive mechanism resides in the difficulty of providing a vertical thrust bearing for the heavy loads involved, with the consequent rapid wear and replacement of the thrust bearings. In addition, due to the high frictional losses in drives including gears, pulleys and belts, and the like, an ultracentrifuge with such a drive tends to decelerate at a relatively high rate when the driving motor is deenergized, resulting in a certain amount of remixing of the separated constituents so that they cannot be recovered after the ultracentrifuge has stopped.

It is an object of the invention therefore, to provide a new and improved driving mechanism for an ultracentrifuge which obviates one or more of the disadvantages of the prior drives for such devices.

More specifically, it is an object of the invention to provide a new and improved driving mechanism for an ultracentrifuge which is capable of precise speed control, which is subject to a minimum of vibration, in which friction is an irreducible minimum, and which is of vrtually indefinite operating life.

In accordance with the invention, there is provided a direct driving mechanism for an ultracentrifuge comprising a vertical drive shaft for the ultracentrifuge, a dynamically balanced magnetically and physically homogeneous cylindrical rotor of high-coercivity magnetic material integral with said shaft, an energizing alternating-current stator surrounding the rotor and forming therewith a self-starting synchronous hysteresis motor, a circuit for supplying high-frequency alterating-current to the stator determinative of the speed of the rotor, a pair of non-supporting vertical alignment bearings for the drive shaft disposed above and below the motor rotor, and a compressed air thrust bearing for the drive shaft disposed below the rotor and normally constituting the entire vertical support for the rotor and a connected ultracentrifuge head. The term "homogeneous" is used herein and in the appended claims in its ordinary sense and in contradistinction to composite structures, such as wound armatures of commutator-type motors.

For a better understanding of the present invention, together with other and further objects thereof, reference is had to the following description, taken in conection with the accompanying drawings, while its scope will be pointed out in the appended claims.

Figure 2:
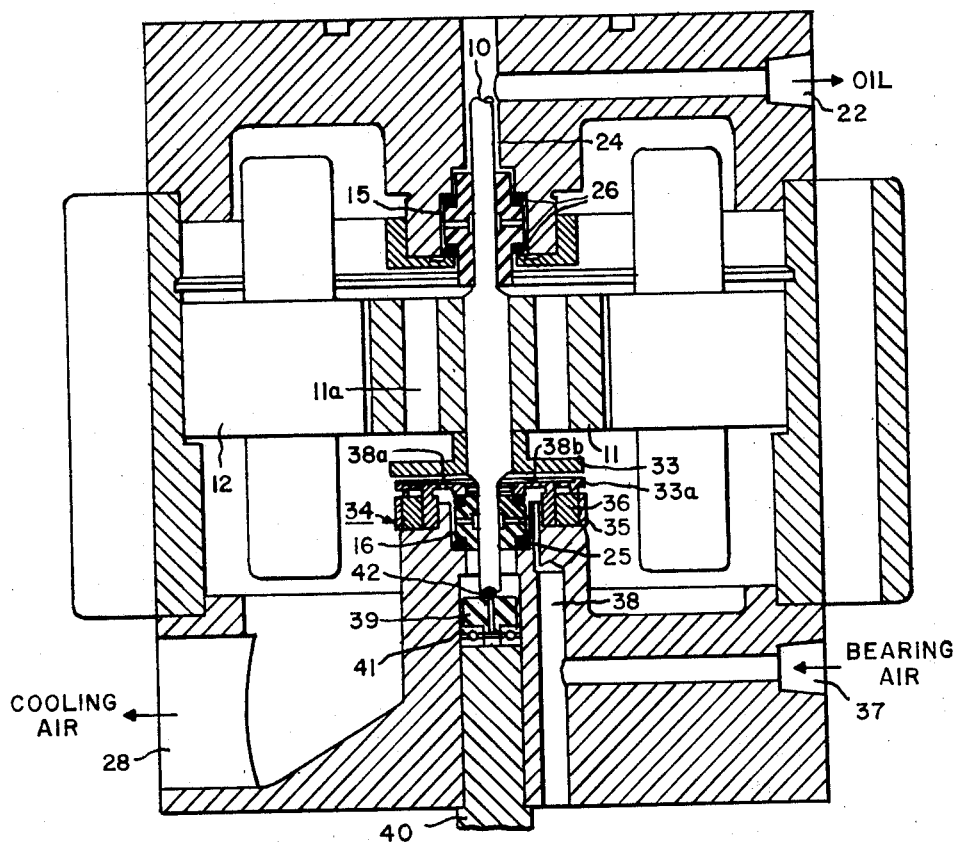

Referring now to the drawings:

FIG. 1 is a view in elevation, partly in section, of a direct driving mechanism for an ultracentrifuge embodying the present invention, while FIG. 2 is a view in elevation, partly in section normal to the section of FIG. 1, of the apparatus of FIG. 1.

Referring now more specifically to the drawings, there is illustrated a direct driving mechanism for an ultracentrifuge comprising a drive shaft 10 and a dynamically balanced homogeneous cylindrical rotor 11 of high-coercitivity magnetic material made integral with the shaft 10 as by brazing or the like. The material of the rotor 11 may, for example, be a ferro-cobalt alloy. The rotor 11 is provided with a series of axially extending bores 11a to assist in cooling during operation.

Surrounding the rotor 11 is an energizing alternating-current stator 12 forming, with the rotor 11, a synchronous hysteresis motor. The motor 11, 12 may be designed in accordance with the teachings of Patent 2,547,599, Roters. The stator 12 is connected to be energized from a high-frequency source 13 via a manual switch 9 and switches 14, 14a, described herein after. The shaft 10 is provided with a pair of forced-lubrication alignment bearings 15, 16 of conventional type and provided with forced lubrication from oil inlets 17, 18 via ducts 19, 20, respectively, and communicating with oil drains or outlets 21, 22 via ducts 23, 24, respectively. There are also provided resilient supporting means for each of the bearings 15, 16 which may be in the form of a pair of polychlyoroprene O-rings 25, 26. A forced-ventilation system for the motor comprises an air inlet duct 27 and an outlet duct 28, the air passing through internal openings in the motor and through the bores 11a of the rotor.

Securely attached to the upper end of the shaft 10 is an ultracentrifuge head 29 provided with a guard ring 30 supported from the frame of the apparatus and a snubber 31 mounted in an opening 32 in the frame to limit precessional movement. It is customary to operate the centrifuge head 29 in a vacuum, in which case the upper forced-lubrication bearing 15 also serves as a vacuum seal.

The driving mechanism of the invention further includes a compressed-air thrust bearing for the shaft 10 disposed below the rotor 11 and normally constituting the entire vertical support for the rotor and the connected ultracentrifuge head 29 during operation. This compressed-air thrust bearing 34 includes a plate 33 secured to the rotor 11 and a stationary seating cup 33a having an up-turned peripheral seating lip and a depending annular flange 33b. Cooperating with the flange 33b is a supporting ring comprising an outer metal shell 35 retaining an annular ring 36 of vibration-damping material such as cork and providing a planar seat for the flange 33b. An inlet conduit 37 for high-pressure compressed air communicates via a conduit 38 and an opening 38a in bearing cap 38b with the annular space between the plate 33 and the sating cup 33a to form effectively a compressed-air chamber which lifts the plate 33, the connected rotor 11, and the ultracentrifuge head 29 from the seating cup 33a, allowing the compressed air to escape over the lip of the cup 33a and thus providing a compressed-air thrust bearing.

The driving mechanism of the ultracentrifuge further includes an auxiliary, normally inactive antifriction thrust bearing comprising a thrust block 39 supported from a post 40 by means of an antifraction thrust bearing 41, the shaft 10 resting upon a single bearing ball 42 seated in the upper face of the thrust block 39.

The post 40 extends into an air pressure chamber 43 depending from the frame of the mechanism and communicating with the compressed-air inlet 37 via the duct 38. Within the chamber 43 is included means responsive to a predetermined low value of compressed air, for example an expansible bellows 44, for bringing the auxiliary thrust bearing 39, 41 into action and for actuating the switch 14 to open the energizing circuit of the stator of the motor and for actuating the switch 14a to apply direct current from terminals 49 to the stator 12 to brake the ultracentrifuge. More specifically, the bellows 44 is closed by a plate 45 sealed to the post 40 and biased upwardly by a helical compression spring 46 surrounding the post 40. The lower end of the post 40 is provided with a recess 47 which engages an actuating element 48 of switch 14 to close the switch when the actuator 48 is depressed and to open the switch when it is released.

If desired, the stator 12, after deenergization by opening switch 9, may be energized from direct-current supply terminals 49 through a manual switch 50 and an adjustable resistor 51 by means of which the ultracentrifuge may be braked smoothly to a stop at any desired rate of deceleration. In case of air failure, the manual switches 9 and 50 are by-passed by automatic switch 14a which causes direct current from terminals 49 to flow through the stator 12 and, thus, stop the ultracentrifuge by braking.

It is believed that the operation of the direct driving mechanism of the present invention will be apparent from the foregoing description. Prior to the closing of switch 9 to initiate operation of the ultracentrifuge, bearing oil is applied to the ports 17 and 18, cooling air to the port 27, and high-pressure compressed air to the bearing-air port 37. Thus, cooling air will be circulated through the motor, oil under moderate pressure, e.g. 8 to 12 lbs./sq. in., will be supplied to the forced-lubrication bearings 15 and 16, and air under moderate pressure, e.g. 8 to 12 lbs./sq. in., will be supplied to the thrust bearing comprising the elements 33 and 33a. The pressure of the bearing air will be adequate to lift the plate 33 and the connected rotor 11 and centrifuge head 29 from the seating cup 33a so that the assembly will be supported on a cushion of air, providing a virtually frictionless thrust bearing. An air bearing of this sort is self-regulating to different loads; that is, if the load is increased, the annular aperture between the plate 33 and the lip of the seating cup 33a is slightly decreased, building up the back pressure through the compressed-air conduit, thus to support the increased load. The reverse operation obviously occurs upon a reduction in the load.

Under the assumed conditions, the air pressure in the chamber 43 will be such that the force on the sealing disc 45 overcomes the force of the compression spring 46 to move the post 40 downwardly so that the auxiliary thrust bearing comprising the elements 39, 41, 42 is lowered to an inactive position. At the same time, switch 14 is actuated to close the circuit between the source 13 and the motor. Actuation of the switch 9 will then place the apparatus in operation. If for any reason air pressure to the air thrust bearing should fall to an unsafe value, the force of the compression spring 46 will move the post 40 upwardly so that the auxiliary thrust bearings 39, 41, 42 will come into action. Normally, such a reduction in pressure of the bearing air will be due to a power failure, in which case the ultracentrifuge head 29 will coast to a stop. If it should be due to any other cause, the opening of switch 14 cuts off the driving power and the closing of switch 14a actuates the brake to stop the ultracentrifuge. If desired, terminals 49 may be energized by a battery which will stop the ultracentrifuge in spite of power failure. It will be understood that the high-frequency alternating-current source 13 may be of any well-known type, preferably one which is adjustable or controllable at any selected one of a number of frequencies which may be accurately determined and accurately maintained at all times, thus facilitating operation of the ultracentrifuge head 29 at an accurately predetermined and maintained speed.

Thus it will be seen that by means of the direct driving mechanism of the invention a number of advantages are secured. The rotor 11 is a solid homogeneous material which is stable thermally and with time and can be relatively easily dynamically balanced. The rotor 11, the integral shaft 10, and the bearing plate 33 form a rigid unitary structure which will not shift in position and thus become unbalanced, even under the extreme forces of high-speed operation. In addition, there are no mechanical drives, such as gears, belts, pulleys, etc., to introduce additional vibrations and to wear out rapidly under the extreme speeds and forces involved.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A direct driving mechanism for an ultracentrifuge comprising:
   a vertical drive shaft for the ultracentrifuge;
   a dynamically balanced magnetically and physically homogeneous cylindrical rotor of high-coercivity magnetic material integral with said shaft;
   an energizing alternating-current stator surrounding said rotor and forming therewith a self-starting synchronous hysteresis motor;
   a circuit for supplying high-frequency alternating-current to said stator determinative of the speed of said rotor;
   a pair of nonsupporting vertical alignment bearings for said shaft disposed above and below said rotor;
   and a compressed-air thrust bearing for said shaft disposed below said rotor and normally constituting the entire vertical support for said rotor and a connected ultracentrifuge head.

2. A direct driving mechanism for an ultracentrifuge comprising:
   a vertical drive shaft for the ultracentrifuge;
   a dynamically balanced magnetically and physically homogeneous cylindrical rotor of high-coercivity magnetic material integral with said shaft;
   an energizing alternating-current stator surrounding said rotor and forming therewith a self-starting synchronous hysteresis motor;
   a circuit for supplying high-frequency alternating-current to said stator determinative of the speed of said rotor;
   a pair of nonsupporting vertical forced-lubrication alignment bearings for said shaft disposed above and below said rotor;
   resilient supporting means for each of said bearings;
   and a compressed-air thrust bearing for said shaft disposed below said rotor and normally constituting the entire vertical support for said rotor and a connected ultracentrifuge head.

3. A direct driving mechanism for an ultracentrifuge comprising:
   a vertical drive shaft for the ultracentrifuge;
   a dynamically balanced magnetically and physically homogeneous cylindrical rotor of high-coercivity magnetic material integral with said shaft;
   an energizing alternating-current stator surrounding said rotor and forming therewith a self-starting synchronous hysteresis motor;
   a circuit for supplying high-frequency alternating-current to said stator determinative of the speed of said rotor;
   a pair of nonsupporting vertical alignment bearings for said shaft disposed above and below said rotor;
   and a compressed-air thrust bearing for said shaft disposed below said rotor and normally constituting the entire vertical support for said rotor and a connected ultracentrifuge head, said thrust bearing including a plate secured to said rotor and a seating disc therefor having a depending annular flange and a supporting planar seat of vibration-damping material for said flange, and an air-pressure conduit for forcing compressed air between said plate and said disc.

4. A direct driving mechanism for an ultracentrifuge comprising:
   a drive shaft for the ultracentrifuge;
   a dynamically balanced homogeneous cylindrical rotor of high-coercivity magnetic material integral with said shaft;
   an energizing alternating-current stator surrounding said rotor and forming therewith a synchronous hysteresis motor;
   a pair of alignment bearings for said shaft disposed above and below said rotor;
   a compressed-air thrust bearing for said shaft disposed below said rotor and normally constituting the entire vertical support for said rotor and a connected ultracentrifuge head;
   an auxiliary normally inactive antifriction thrust bearing for said shaft;
   and means responsive to a predetermined low value of air pressure to said compressed-air bearing for bringing said auxiliary bearing into action.

5. A direct driving mechanism for an ultracentrifuge comprising:
   a drive shaft for the ultracentrifuge;
   a dynamically balanced homogeneous cylindrical rotor of high-coercivity magnetic material integral with said shaft;
   an energizing alternating-current stator surrounding said rotor and forming therewith a synchronous hysteresis motor;
   an energizing circuit for said stator:
   a pair of alignment bearings for said shaft disposed above and below said rotor;
   a compressed-air thrust bearing for said shaft disposed below said rotor and normally constituting the entire vertical support for said rotor and a connected ultracentrifuge head;
   and means responsive to a predetermined low value of air pressure ot said compressed-air bearing for opening said energizing circuit of said stator.

6. A direct driving mechanism for an ultracentrifuge comprising:
   a drive shaft for the ultracentrifuge;
   a dynamically balanced homogeneous cylindrical rotor of high-coercivity magnetic material integral with said shaft;
   an energizing alternating-current stator surrounding said rotor and forming therewith a synchronous hysteresis motor;
   an energizing circuit for said stator;
   a pair of alignment bearings for said shaft disposed above and below said rotor;
   a compressed-air thrust bearing for said shaft disposed below said rotor and normally constituting the entire vertical support for said rotor and a connected ultracentrifuge head;
   an auxiliary normally inactive antifriction thrust bearing for said shaft;
   and means responsive to a predetermined low value of air pressure to said compressed-air bearing for opening said energizing circuit of said stator and for bringing said auxiliary bearing into action.

7. A direct driving mechanism for an ultracentrifuge comprising:
   a drive shaft for the ultracentrifuge;
   a dynamically balanced homogeneous cylindrical rotor of high-coercivity magnetic material intergral with said shaft;
   an energizing alternating-current stator surrounding said rotor and forming therewith a synchronous hysteresis motor;
   an energizing circuit for said stator;
   a switch for controlling said circuit;
   a pair of alignment bearings for said shaft disposed above and below said rotor;

a compressed-air thrust bearing for said shaft disposed below said rotor and a connected ultracentrifuge head;

and an expansible bellows responsive to a predetermined low value of air pressure to said compressed-air bearing for actuating said switch to open said motor-energizing circuit.

References Cited

UNITED STATES PATENTS

| | | | |
|---|---|---|---|
| 2,207,717 | 7/1940 | Carter | 310—157 X |
| 2,605,147 | 7/1952 | Raichle et al. | 308—9 |
| 2,716,381 | 8/1955 | Parker | 318—418 X |
| 2,785,023 | 3/1957 | Naumann. | |
| 3,105,164 | 9/1963 | Faurot | 310—266 |
| 2,640,736 | 6/1953 | Wahlmark | 277—188 XR |
| 2,767,339 | 10/1956 | Hatfield | 310—162 |
| 2,885,915 | 5/1959 | Schutger | 77—64 |
| 2,981,855 | 4/1961 | Lieshout | 310—163 |
| 3,152,845 | 10/1964 | Ertaud | 308—9 |

ORIS L. RADER, Primary Examiner

ALFRED G. COLLINS, Assistant Examiner

U.S. Cl. X.R.

310—90